United States Patent
Morioka et al.

(10) Patent No.: US 7,216,965 B2
(45) Date of Patent: May 15, 2007

(54) INKJET PRINTER INK

(75) Inventors: Junko Morioka, Mitsukaido (JP);
Takayuki Ookawa, Mitsukaido (JP);
Tomoya Yamamoto, Mitsukaido (JP);
Yukiko Tachibana, Mitsukaido (JP);
Hitoshi Inoue, Mitsukaido (JP)

(73) Assignee: Canon Finetech Inc., Mitsukaido-shi (JP)

( * ) Notice: Subject to any disclaimer, the term of this patent is extended or adjusted under 35 U.S.C. 154(b) by 227 days.

(21) Appl. No.: 10/518,071

(22) PCT Filed: Dec. 19, 2003

(86) PCT No.: PCT/JP03/16366

§ 371 (c)(1),
(2), (4) Date: Dec. 16, 2004

(87) PCT Pub. No.: WO2004/061022

PCT Pub. Date: Jul. 22, 2004

(65) Prior Publication Data

US 2005/0225617 A1    Oct. 13, 2005

(30) Foreign Application Priority Data

Dec. 27, 2002 (JP) .............................. 2002-379607

(51) Int. Cl.
*G01D 11/00* (2006.01)

(52) U.S. Cl. .................... 347/100; 347/95; 523/160

(58) Field of Classification Search ................ 347/100, 347/95, 96, 101; 106/31.27, 31.13, 31.6; 523/160
See application file for complete search history.

(56) References Cited

U.S. PATENT DOCUMENTS

| | | | | |
|---|---|---|---|---|
| 5,439,514 A | * | 8/1995 | Kashiwazaki et al. | 347/100 |
| 5,990,227 A | * | 11/1999 | Takizawa et al. | 106/31.39 |
| 7,022,170 B2 | * | 4/2006 | Taguchi et al. | 106/31.46 |
| 2002/0049261 A1 | * | 4/2002 | Soga et al. | 523/160 |

FOREIGN PATENT DOCUMENTS

| | | |
|---|---|---|
| EP | 0 618 279 B1 | 6/2001 |
| EP | 1 184 427 A2 | 3/2002 |
| JP | 6-49399 A | 1/1989 |
| JP | 8-176480 A | 7/1996 |
| JP | 8-253717 A | 10/1996 |
| JP | 2002-127586 A | 5/2002 |

OTHER PUBLICATIONS

English translation of abstract and claims of JP 06-049339.
English translation of abstract and claims of JP 08-253717.
Supplemental European Search Report, dated Nov. 22, 2005.
Chinese Office Action dated Mar. 24, 2006.

* cited by examiner

*Primary Examiner*—Manish S. Shah
(74) *Attorney, Agent, or Firm*—Harness, Dickey & Pierce, P.L.C.

(57) ABSTRACT

A water-based inkjet printer ink contains at least a colorant and a resin. The resin is a block copolymer, which contains at least one hydrophilic block and at least one hydrophobic block. Each of the blocks is a vinyl ether polymer, wherein said block copolymer is obtained by polymerizing vinyl ethers as monomer by using at least one aluminum compound selected from the group consisting of tripropylaluminum, triisopropylaluminum and aluminum compounds as Ziegler-Natta catalysts.

6 Claims, No Drawings

INKJET PRINTER INK

TECHNICAL FIELD

This invention relates to water-based inks suitably usable in inkjet printers.

BACKGROUND ART

Inkjet recording has long been known as an image-forming process. In inkjet recording, there are outstanding demands for images of higher quality, faster printing speed and high-speed fixing performance, and from an ecological standpoint, there is an ever increasing demand for energy saving. Among these, the demand for a speed-up in the fixing process upon formation of an image and that for images of higher quality are surging. With a view to achieving these improvements, investigations have been made to develop a low-energy-consumption and high-speed fixing process in inkjet recording, resulting in proposals such as use of a reactive ink with a reactive colorant contained therein (see JP 8-253717 A) and use of a compound having reversible thermal gelation property (see JP 649399). However, there is still a larger room for improvements in high-speed fixing performance.

With a view to meeting the above-described demands, the present invention has as an object thereof the provision of a water-based inkjet printer ink (hereinafter simply called "ink" or "water-based ink") which has excellent fixing property and permits stable ejection from nozzles and formation of images with good abrasion resistance, waterproofness and good marker resistance.

DISCLOSURE OF THE INVENTION

The above-described object can be achieved by the present invention to be described hereinafter. Specifically, the present invention provides a water-based inkjet printer ink comprising at least a colorant and a resin, characterized in that the resin is a block copolymer comprising at least one hydrophilic block and at least one hydrophobic block, each of the blocks is a vinyl ether polymer, and the ink further comprises aluminum or an aluminum compound.

In the ink, the molar ratio of the resin (A) to the aluminum or aluminum compound (B), A:B, may be preferably from 1:5 to 10,000:3, more preferably from 100:6 to 1,000:3.

The present invention also provides an ink jet recording process characterized in that images are formed by an inkjet recording system while using the ink according to the present invention.

BEST MODES FOR CARRYING OUT THE INVENTION

Based on certain preferred embodiments, the present invention will next be described in further detail. Components essential to the ink of the present invention are the colorant, resin and aluminum (or aluminum compound) and an aqueous medium to be described subsequently herein. Among these, the resin and aluminum (or aluminum compound) act to have the colorant, which is contained in the ink, fixed on a recording medium such as paper after the ink is applied to the recording medium.

In the present invention, the resin for use in the ink is required to be a block copolymer comprising at least one hydrophilic block and at least one hydrophobic block, in that each of the blocks is a vinyl ether polymer. Those containing one or more hydrophobic blocks and two or more hydrophobic blocks or those containing two or more hydrophobic blocks and one or more hydrophilic blocks can also be used. These two or more hydrophilic blocks and/or these two or more hydrophobic blocks may be of the same type or of different types. As the block copolymer, a single block copolymer or a blend of two or more block copolymers can be used. Namely, in the copolymer block copolymers of the invention, an example can be an A-B diblock copolymer, an A-B-A tricopolymer, an A-B-C tricopolymer, a C-B-A tricopolymer or a C-A-B tricopolymer, wherein A, B and C represent a hydrophilic block or a hydrophobic block, respectively, and each is not the same as the others. The structure of each copolymer can be linear, graft or the like, although a linear block copolymer is preferred.

As the resin, one obtained by polymerizing vinyl ethers as monomers and containing a polyvinyl ether structure is preferred because it forms a stable dispersion with colorant particles. Particularly preferred is a resin at least one hydrophilic block of which is either an anionic polyvinyl ether block or a diblock copolymer composed of a nonionic polyvinyl ether block and an anionic polyvinyl ether block, because the colorant particles dispersed in the ink medium are provided with further improved stability. When the at least one hydrophilic block of the resin is a diblock copolymer composed of a nonionic polyvinyl ether block and an anionic polyvinyl ether block, a block copolymer composed of a polyvinyl ether block having hydrophobicity, the nonionic polyvinyl ether block having hydrophilicity and the anionic polyvinyl ether block having hydrophilicity in this order is more desired because the colorant particles dispersed in the ink medium are provided with still further improved stability.

As the polyvinyl ether block having hydrophobicity and forming the above-described resin, a block having a recurring unit structure represented by the following formula (1) is preferred:

$$-(CH_2-CH(OR^1))- \qquad (1)$$

In the above-described formula (1), $R^1$ represents an aliphatic hydrocarbon group such as an alkyl, alkenyl, cycloalkyl or cycloalkenyl group; or an aromatic hydrocarbon group one or more of carbon atoms of which may be substituted by nitrogen atoms, such as a phenyl, pyridyl, benzyl, toluyl, xylyl, alkylphenyl, phenylalkyl, biphenyl or phenylpyridyl group. One or more of the hydrogen atoms on the aromatic ring may be substituted by hydrocarbon groups. The carbon number of $R^1$ may preferably range from 1 to 18.

$R^1$ can also be a group represented by $-(CH(R^2)-CH(R^3)-O)_p-R^4$ or $-(CH_2)_m-(O)_n-R^4$. In this case, $R^2$ and $R^3$ each independently represents a hydrogen atom or a methyl group, and $R^4$ represents an aliphatic hydrocarbon group such as an alkyl, alkenyl, cycloalkyl or cycloalkenyl group, an aromatic hydrocarbon group one or more of carbon atoms of which may be substituted by nitrogen atoms, such as a phenyl, pyridyl, benzyl, toluyl, xylyl, alkylphenyl, phenylalkyl, biphenyl or phenylpyridyl group, with one or more hydrogen atoms on the aromatic ring being optionally substituted by hydrocarbon groups, $-CO-CH=CH_2$, $-CO-C(CH_3)=CH_2$, $-CH_2-CH=CH_2$, $-CH_2-C(CH_3)=CH_2$. In each of these groups, one or more hydrogen atoms may be substituted by halogen atoms such as fluorine, chlorine or bromine atoms to chemically feasible extent. The carbon number of $R^4$ may preferably range from 1 to 18. Preferably, p can range from 1 to 18, m can range from 1 to 36, and n can be 0 or 1.

In $R^1$ and $R^4$, examples of the alkyl and alkenyl groups can include methyl, ethyl, propyl, isopropyl, n-butyl, sec-butyl, t-butyl, pentyl, hexyl, heptyl, octyl, nonyl, decyl, dodecyl, tetradecyl, hexadecyl, octadecyl, oleyl and linoleyl, and examples of the cycloalkyl and cycloalkenyl groups can include cyclopropyl, cyclobutyl, cyclopentyl, cyclohexyl, cyclooctyl and cyclohexenyl.

As the polyvinyl ether block having hydrophilicity, on the other hand, a block having a recurring unit structure represented by the following formula (2) is preferred:

(2)

In the above-described formula (2), $R^5$ is a group represented by $-(CH_2-CH_2-O)_k-R^6$, $-(CH_2)_m-(O)_n-R^6$, $-R^7-X$, $-(CH_2-CH_2-O)_k-R^7-X$ or $-(CH_2)_m-(O)_n-X$. In this case, $R^6$ represents a hydrogen atom, a linear or branched $C_{1-4}$ alkyl group, $-CO-CH=CH_2$, $-CO-C(CH_3)=CH_2$, $-CH_2-CH=CH_2$, $-CH_2-C(CH_3)=CH_2$, and $R^7$ represents an aliphatic hydrocarbon group such as an alkylene, alkenylene, cycloalkylene or cycloalkenylene group, or an aromatic hydrocarbon group one or more of carbon atoms of which may be substituted by nitrogen atoms, such as a phenylene, pyridylene, benzylene, toluylene, xylylene, alkylphenylene, phenylenealkylene, biphenylene or phenylpyridylene group, with one or more hydrogen atoms on the aromatic ring being optionally substituted by hydrocarbon groups. In each of these groups, one or more hydrogen atoms may be substituted by halogen atoms such as fluorine, chlorine or bromine atoms to chemically feasible extent. X represents a group having anionic property, such as a carboxylate, sulfonate or phosphate group. The carbon number of $R^7$ may preferably range from 1 to 18. Preferably, k can range from 1 to 18, m can range from 1 to 36, and n can be 0 or 1.

Structures of the above-described monomers (I-a to I-o) and block copolymers (II-a to II-e) composed of the monomers will be exemplified below, although the structures of block copolymers usable in the present invention are not limited to them.

(I-a)

(I-b)

(I-c)

(I-d)

(I-e)

(I-f)

(I-g)

(I-h)

-continued

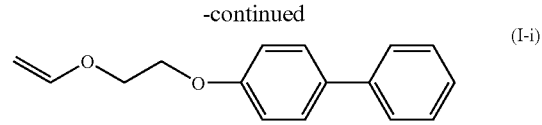
(I-i)

(I-j)

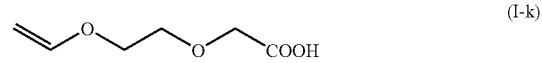
(I-k)

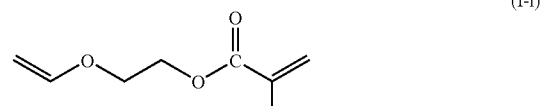
(I-l)

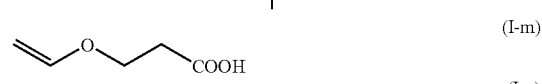
(I-m)

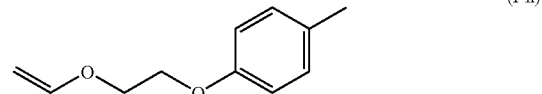
(I-n)

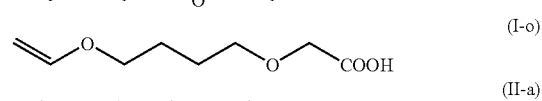
(I-o)

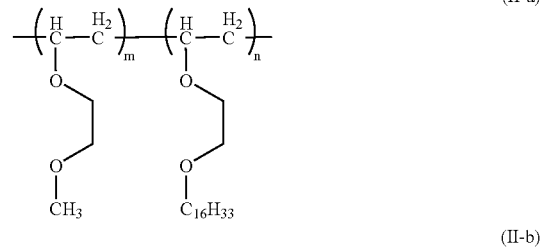
(II-a)

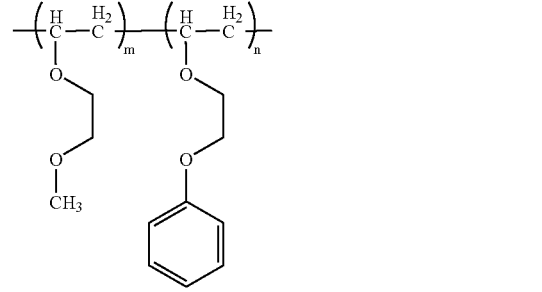
(II-b)

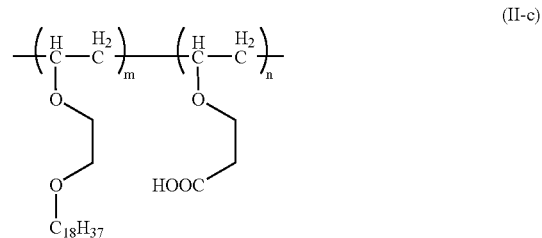
(II-c)

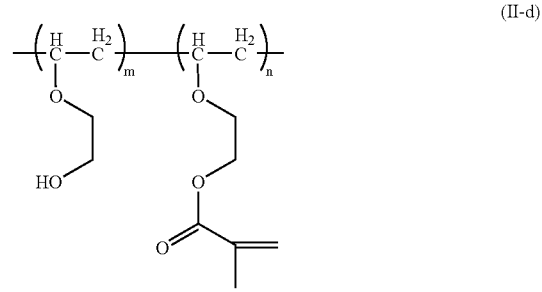
(II-d)

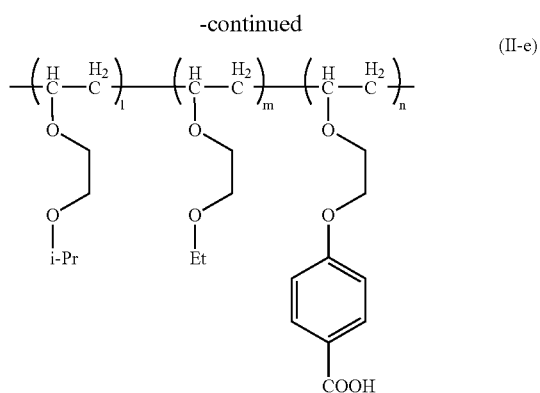

(II-e)

The preferred numbers of the respective recurring units in the block copolymers (i.e., m, n and 1 in the above-exemplified recurring units (II-a) to (II-e)) may each independently range from 1 to 10,000. More preferably, their total (i.e., m+n+1 in the above-exemplified recurring units (II-a) to (II-e)) may range from 10 to 20,000. The number average molecular weight may range preferably from 500 to 20,000,000, more preferably from 1,000 to 5,000,000, most preferably from 2,000 to 2,000,000. Usable as blocks formed of these polyvinyl ethers can include those obtained by grafting the polyvinyl ethers on other polymers and those obtained by copolymerizing the above-described vinyl monomers with other recurring unit structures.

No particular limitation is imposed on the process for the synthesis of block copolymers having recurring units formed of the above-described vinyl ether monomers, respectively. Nonetheless, use of cation living polymerization makes it possible to synthesize various polymers homopolymers, copolymers formed of two or more monomers, block copolymers, graft polymers and graduation polymers, with their lengths (molecular weights) being precisely controlled. Further, various functional groups can also be introduced on side chains of these block copolymers.

The water-based ink according to the present invention contains aluminum (including aluminum ions) or an aluminum compound in addition to the above-described resin (block copolymer). This aluminum or aluminum compound is concerned with the fixing property of the ink upon forming an image. The molar ratio of the resin (A) to the aluminum or aluminum compound (B), A:B, in the ink may, therefore, be preferably from 1:5 to 10,000:3, more preferably from 100:6 to 1,000:3.

If the molar ratio of the aluminum (aluminum compound) to the resin is unduly small, the ink according to the present invention may not be provided with sufficient fixing property to a recording material and may be unable to form an image with sufficient abrasion resistance, waterproofness and marker resistance. If the molar ratio of the aluminum (aluminum compound) to the resin is excessively large, on the other hand, the water-based ink may be provided with lowered ejection stability. As the aluminum compound, an aluminum-containing, organic or inorganic compound can be used.

Illustrative are alumina, aluminum hydroxide, tripropylaluminum, triisopropylaluminum, and aluminum compounds as Ziegler-Natta catalysts.

The improved ink fixing property, image waterproofness and image abrasion resistance, which are available when an image is formed with the ink of the present invention containing the resin and aluminum or the aluminum compound, are considered to be attributable to agglomeration of the resin induced as a result of action of the aluminum compound having cationic character or its ions on ether bond portions in the resin.

When an organoaluminum compound is used as a catalyst in the production of the above-described vinyl ether block copolymer, the content of the organoaluminum compound in the resulting block copolymer may exceed the above-described range. In such a case, it is preferred to purify the polymer such that the content of the organoaluminum compound is lowered to bring the ratio of the resin to the organoaluminum compound to the above-described molar ratio. The purification method of the polymer can include, but not limited to, washing with an acidic aqueous solution, dialysis, ultrafiltration, reprecipitation, and adsorption by an adsorbent. If the amount of aluminum (or aluminum compound) which would remain in the resulting block copolymer is known in the production of the block copolymer, the amounts of the resin and aluminum (or aluminum compound) to be used, including the remaining aluminum (or aluminum compound), can be set at the above-described molar ratio.

Examples of the colorant for use in the present invention include acid dyes, direct dyes, basic dyes, reactive dyes, food dyes, vat dyes, soluble vat dyes, reactive disperse dyes, disperse dyes, inorganic pigments, and organic pigments. Taking into consideration the waterproofness of images to be formed, oil soluble dyes are more preferred. Examples of dyes and pigments will be described below although the present invention is not limited to them.

(Direct Dyes)

C.I. Direct Black 17, C.I. Direct Black 19, C.I. Direct Black 22, C.I. Direct Black 32, C.I. Direct Black 38, C.I. Direct Black 51, C.I. Direct Black 62, C.I. Direct Black 71, C.I. Direct Black 108, C.I. Direct Black 146, C.I. Direct Black 154; C.I. Direct Yellow 12, C.I. Direct Yellow 24, C.I. Direct Yellow 26, C.I. Direct Yellow 44, C.I. Direct Yellow 86, C.I. Direct Yellow 87, C.I. Direct Yellow 98, C.I. Direct Yellow 100, C.I. Direct Yellow 130, C.I. Direct Yellow 142; C.I. Direct Red 1, C.I. Direct Red 4, C.I. Direct Red 13, C.I. Direct Red 17, C.I. Direct Red 23, C.I. Direct Red 28, C.I. Direct Red 31, C.I. Direct Red 62, C.I. Direct Red 79, C.I. Direct Red 81, C.I. Direct Red 83, C.I. Direct Red 89, C.I. Direct Red 227, C.I. Direct Red 240, C.I. Direct Red 242, C.I. Direct Red 243; C.I. Direct Blue 6, C.I. Direct Blue 22, C.I. Direct Blue 25, C.I. Direct Blue 71, C.I. Direct Blue 78, C.I. Direct Blue 86, C.I. Direct Blue 90, C.I. Direct Blue 106, C.I. Direct Blue 199; C.I. Direct Orange 34, C.I. Direct Orange 39, C.I. Direct Orange 44, C.I. Direct Orange 46, C.I. Direct Orange 60; C.I. Direct Violet 47, C.I. Direct Violet 48; C.I. Direct Brown 109; C.I. Direct Green 59; etc.;

(Acid Dyes)

C.I. Acid Black 2, C.I. Acid Black 7, C.I. Acid Black 24, C.I. Acid Black 26, C.I. Acid Black 31, C.I. Acid Black 52, C.I. Acid Black 63, C.I. Acid Black 112, C.I. Acid Black 118, C.I. Acid Black 168, C.I. Acid Black 172, C.I. Acid Black 208; C.I. Acid Yellow 11, C.I. Acid Yellow 17, C.I. Acid Yellow 23, C.I. Acid Yellow 25, C.I. Acid Yellow 29, C.I. Acid Yellow 42, C.I. Acid Yellow 49, C.I. Acid Yellow 61, C.I. Acid Yellow 71; C.I. Acid Red 1, C.I. Acid Red 6, C.I. Acid Red 8, C.I. Acid Red 32, C.I. Acid Red 37, C.I. Acid Red 51, C.I. Acid Red 52, C.I. Acid Red 80, C.I. Acid Red 85, C.I. Acid Red 87, C.I. Acid Red 92, C.I. Acid Red 94, C.I. Acid Red 115, C.I. Acid Red 180, C.I. Acid Red 254, C.I. Acid Red 256, C.I. Acid Red 289, C.I. Acid Red 315, C.I. Acid Red 317; C.I. Acid Blue 9, C.I. Acid Blue 22, C.I.

Acid Blue 40, C.I. Acid Blue 59, C.I. Acid Blue 93, C.I. Acid Blue 102, C.I. Acid Blue 104, C.I. Acid Blue 113, C.I. Acid Blue 117, C.I. Acid Blue 120, C.I. Acid Blue 167, C.I. Acid Blue 229, C.I. Acid Blue 234, C.I. Acid Blue 254; C.I. Acid Orange 7, C.I. Acid Orange 19; C.I. Acid Violet 49; etc.;

(Reactive Dyes)

C.I. Reactive Black 1, C.I. Reactive Black 5, C.I. Reactive Black 8, C.I. Reactive Black 13, C.I. Reactive Black 14, C.I. Reactive Black 23, C.I. Reactive Black 31, C.I. Reactive Black 34, C.I. Reactive Black 39; C.I. Reactive Yellow 2, C.I. Reactive Yellow 3, C.I. Reactive Yellow 13, C.I. Reactive Yellow 15, C.I. Reactive Yellow 17, C.I. Reactive Yellow 18, C.I. Reactive Yellow 23, C.I. Reactive Yellow 24, C.I. Reactive Yellow 37, C.I. Reactive Yellow 42, C.I. Reactive Yellow 57, C.I. Reactive Yellow 58, C.I. Reactive Yellow 64, C.I. Reactive Yellow 75, C.I. Reactive Yellow 76, C.I. Reactive Yellow 77, C.I. Reactive Yellow 79, C.I. Reactive Yellow 81, C.I. Reactive Yellow 84, C.I. Reactive Yellow 85, C.I. Reactive Yellow 87, C.I. Reactive Yellow 88, C.I. Reactive Yellow 91, C.I. Reactive Yellow 92, C.I. Reactive Yellow 93, C.I. Reactive Yellow 95, C.I. Reactive Yellow 102, C.I. Reactive Yellow 111, C.I. Reactive Yellow 115, C.I. Reactive Yellow 116, C.I. Reactive Yellow 130, C.I. Reactive Yellow 131, C.I. Reactive Yellow 132, C.I. Reactive Yellow 133, C.I. Reactive Yellow 135, C.I. Reactive Yellow 137, C.I. Reactive Yellow 139, C.I. Reactive Yellow 140, C.I. Reactive Yellow 142, C.I. Reactive Yellow 143, C.I. Reactive Yellow 144, C.I. Reactive Yellow 145, C.I. Reactive Yellow 146, C.I. Reactive Yellow 147, C.I. Reactive Yellow 148, C.I. Reactive Yellow 151, C.I. Reactive Yellow 162, C.I. Reactive Yellow 163; C.I. Reactive Red 3, C.I. Reactive Red 13, C.I. Reactive Red 16, C.I. Reactive Red 21, C.I. Reactive Red 22, C.I. Reactive Red 23, C.I. Reactive Red 24, C.I. Reactive Red 29, C.I. Reactive Red 31, C.I. Reactive Red 33, C.I. Reactive Red 35, C.I. Reactive Red 45, C.I. Reactive Red 49, C.I. Reactive Red 55, C.I. Reactive Red 63, C.I. Reactive Red 85, C.I. Reactive Red 106, C.I. Reactive Red 109, C.I. Reactive Red 111, C.I. Reactive Red 112, C.I. Reactive Red 113, C.I. Reactive Red 114, C.I. Reactive Red 118, C.I. Reactive Red 126, C.I. Reactive Red 128, C.I. Reactive Red 130, C.I. Reactive Red 131, C.I. Reactive Red 141, C.I. Reactive Red 151, C.I. Reactive Red 170, C.I. Reactive Red 171, C.I. Reactive Red 174, C.I. Reactive Red 176, C.I. Reactive Red 177, C.I. Reactive Red 183, C.I. Reactive Red 184, C.I. Reactive Red 186, C.I. Reactive Red 187, C.I. Reactive Red 188, C.I. Reactive Red 190, C.I. Reactive Red 193, C.I. Reactive Red 194, C.I. Reactive Red 195, C.I. Reactive Red 196, C.I. Reactive Red 200, C.I. Reactive Red 201, C.I. Reactive Red 202, C.I. Reactive Red 204, C.I., Reactive Red 206, C.I. Reactive Red 218, C.I. Reactive Red 221; C.I. Reactive Blue 2, C.I. Reactive Blue 3, C.I. Reactive Blue 5, C.I. Reactive Blue 8, C.I. Reactive Blue 10, C.I. Reactive Blue 13, C.I. Reactive Blue 14, C.I. Reactive Blue 15, C.I. Reactive Blue 18, C.I. Reactive Blue 19, C.I. Reactive Blue 21, C.I. Reactive Blue 25, C.I. Reactive Blue 27, C.I. Reactive Blue 28, C.I. Reactive Blue 38, C.I. Reactive Blue 39, C.I. Reactive Blue 40, C.I. Reactive Blue 41, C.I. Reactive Blue 49, C.I. Reactive Blue 52, C.I. Reactive Blue 63, C.I. Reactive Blue 71, C.I. Reactive Blue 72, C.I. Reactive Blue 74, C.I. Reactive Blue 75, C.I. Reactive Blue 77, C.I. Reactive Blue 78, C.I. Reactive Blue 79, C.I. Reactive Blue 89, C.I. Reactive Blue 100, C.I. Reactive Blue 101, C.I. Reactive Blue 104, C.I. Reactive Blue 104, C.I. Reactive Blue 105, C.I. Reactive Blue 119, C.I. Reactive Blue 122, C.I. Reactive Blue 147, C.I. Reactive Blue 158, C.I. Reactive Blue 160, C.I. Reactive Blue 162, C.I. Reactive Blue 166, C.I. Reactive Blue 169, C.I. Reactive Blue 170, C.I. Reactive Blue 171, C.I. Reactive Blue 172, C.I. Reactive Blue 173, C.I. Reactive Blue 174, C.I. Reactive Blue 176, C.I. Reactive Blue 179, C.I. Reactive Blue 184, C.I. Reactive Blue 190, C.I. Reactive Blue 191, C.I. Reactive Blue 194, C.I. Reactive Blue 195, C.I. Reactive Blue 198, C.I. Reactive Blue 204, C.I. Reactive Blue 211, C.I. Reactive Blue 216, C.I. Reactive Blue 217; C.I. Reactive Orange 5, C.I. Reactive Orange 7, C.I. Reactive Orange 11, C.I. Reactive Orange 12, C.I. Reactive Orange 13, C.I. Reactive Orange 15, C.I. Reactive Orange 16, C.I. Reactive Orange 35, C.I. Reactive Orange 45, C.I. Reactive Orange 46, C.I. Reactive Orange 56, C.I. Reactive Orange 62, C.I. Reactive Orange 70, C.I. Reactive Orange 72, C.I. Reactive Orange 74, C.I. Reactive Orange 82, C.I. Reactive Orange 84, C.I. Reactive Orange 87, C.I. Reactive Orange 91, C.I. Reactive Orange 92, C.I. Reactive Orange 93, C.I. Reactive Orange 95, C.I. Reactive Orange 97, C.I. Reactive Orange 99; C.I. Reactive Violet 1, C.I. Reactive Violet 4, C.I. Reactive Violet 5, C.I. Reactive Violet 6, C.I. Reactive Violet 22, C.I. Reactive Violet 24, C.I. Reactive Violet 33, C.I. Reactive Violet 36, C.I. Reactive Violet 38; C.I. Reactive Green 5, C.I. Reactive Green 8, C.I. Reactive Green 12, C.I. Reactive Green 15, C.I. Reactive Green 19, C.I. Reactive Green 23; C.I. Reactive Brown 2, C.I. Reactive Brown 7, C.I. Reactive Brown 8, C.I. Reactive Brown 9, C.I. Reactive Brown 11, C.I. Reactive Brown 16, C.I. Reactive Brown 17, C.I. Reactive Brown 18, C.I. Reactive Brown 21, C.I. Reactive Brown 24, C.I. Reactive Brown 26, C.I. Reactive Brown 31, C.I. Reactive Brown 32, C.I. Reactive Brown 33; etc.;

(Basic Dyes)

C.I. Basic Black 2; C.I. Basic Red 1, C.I. Basic Red 2, C.I. Basic Red 9, C.I. Basic Red 12, C.I. Basic Red 13, C.I. Basic Red 14, C.I. Basic Red 27; C.I. Basic Blue 1, C.I. Basic Blue 3, C.I. Basic Blue 5, C.I. Basic Blue 7, C.I. Basic Blue 9, C.I. Basic Blue 24, C.I. Basic Blue 25, C.I. Basic Blue 26, C.I. Basic Blue 28, C.I. Basic Blue 29; C.I. Basic Violet 7, C.I. Basic Violet 14, C.I. Basic Violet 27; C.I. Food Black 1, C.I. Food Black 2; etc.;

(Oil-Soluble Dyes)

C.I. Solvent Yellow 1, C.I. Solvent Yellow 2, C.I. Solvent Yellow 3, C.I. Solvent Yellow 13, C.I. Solvent Yellow 19, C.I. Solvent Yellow 22, C.I. Solvent Yellow 29, C.I. Solvent Yellow 36, C.I. Solvent Yellow 37, C.I. Solvent Yellow 38, C.I. Solvent Yellow 39, C.I. Solvent Yellow 40, C.I. Solvent Yellow 43, C.I. Solvent Yellow 44, C.I. Solvent Yellow 45, C.I. Solvent Yellow 47, C.I. Solvent Yellow 62, C.I. Solvent Yellow 63, C.I. Solvent Yellow 71, C.I. Solvent Yellow 76, C.I. Solvent Yellow 81, C.I. Solvent Yellow 85, C.I. Solvent Yellow 86, etc.; C.I. Solvent Red 35, C.I. Solvent Red 36, C.I. Solvent Red 37, C.I. Solvent Red 38, C.I. Solvent Red 39, C.I. Solvent Red 40, C.I. Solvent Red 58, C.I. Solvent Red 60, C.I. Solvent Red 65, C.I. Solvent Red 69, C.I. Solvent Red 81, C.I. Solvent Red 86, C.I. Solvent Red 89, C.I. Solvent Red 92, C.I. Solvent Red 97, C.I. Solvent Red 99, C.I. Solvent Red 100, C.I. Solvent Red 109, C.I. Solvent Red 118, C.I. Solvent Red 119, C.I. Solvent Red 122, etc.; C.I. Solvent Blue 14, C.I. Solvent Blue 24, C.I. Solvent Blue 26, C.I. Solvent Blue 34, C.I. Solvent Blue 37, C.I. Solvent Blue 39, C.I. Solvent Blue 42, C.I. Solvent Blue 43, C.I. Solvent Blue 45, C.I. Solvent Blue 48, C.I. Solvent Blue 52, C.I. Solvent Blue 53, C.I. Solvent Blue 55, C.I. Solvent Blue 59, C.I. Solvent Blue 67, etc.; C.I. Solvent Black 5, C.I. Solvent Black 8, C.I. Solvent Black 14, C.I. Solvent Black 17, C.I. Solvent Black 19, C.I. Solvent Black 20, C.I. Solvent Black 22, C.I. Solvent Black 24, C.I. Solvent Black 26, C.I. Solvent Black 28, C.I. Solvent Black 43, etc.;

(Pigments)

"Raven 760 Ultra", "Raven 1060 Ultra", "Raven 1080", "Raven 1100 Ultra", "Raven 1170", "Raven 1200", "Raven 1250", "Raven 1255", "Raven 1500", "Raven 2000", "Raven 2500 Ultra", "Raven 3500", "Raven 5250", "Raven 5750", "Raven 7000", "Raven 5000 ULTRA-II", "Raven 1190 ULTRA-II" (trade names, products of Columbian Carbon Co.); "Black PearlsL", "MOGULL", "RegaL-330R", "RegaL-400R", "RegaL-660R", "Monarch-800", "Monarch-880", "Monarch-900", "Monarch-1000", "Monarch-1300", "Monarch-1400" (trade names, products of Cabot Corporation);

"Color Black FW1", "Color Black FW2", "Color Black FW200", "Color Black 18", "Color Black S160", "Color Black S170", "Special Black 4", "Special Black 4A", "Special Black 6", "Special Black 550", "Printex 35", "Printex 45", "Printex 55", "Printex 85", "Printex 95", "Printex U", "Printex 140U,", "Printex V", "Printex 140V" (trade names, products of Degussa AG); "No. 25", "No. 33", "No. 40", "No. 45", "No. 47", "No. 52", "No. 900", "No. 970", "No. 2200B", "No. 2300", "No. 2400B", "MCF-88", "MA600", "MA77", "MA8", "MA100", "MA230", "MA220" (trade names; products of Mitsubishi Chemical Corporation);

C.I. Pigment Blue 1, C.I. Pigment Blue 2, C.I. Pigment Blue 3, C.I. Pigment Blue 15, C.I. Pigment Blue 15:2, C.I. Pigment Blue 15:3, C.I. Pigment Blue 15:4, C.I. Pigment Blue 16, C.I. Pigment Blue 22, C.I. Pigment Blue 60, etc.; C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184, C.I. Pigment Red 202, C.I. Pigment Red 207, etc.;

C.I. Pigment Yellow 12, C.I. Pigment Yellow 13, C.I. Pigment Yellow 14, C.I. Pigment Yellow 16, C.I. Pigment Yellow 17, C.I. Pigment Yellow 74, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 128, C.I. Pigment Yellow 129, C.I. Pigment Yellow 151, C.I. Pigment Yellow 154, etc.

The weight ratio of the colorant (A) to the ink (B), A:B, in the ink may range preferably from 1:0.01 to 1:2 in terms of solids. An excessively small resin amount may result in an ink having insufficient fixing property to a recording material so that an image formed with the ink may be insufficient in abrasion resistance, waterproofness, marker resistance and the like. An unduly large resin amount, on the other hand, may result in a water-based ink having high viscosity so that the water-based ink may be provided with reduced ejection stability and anti-clogging property.

The water-based ink according to the present invention requires an aqueous medium for dispersing or dissolving the colorant and resin. The aqueous medium may contain an organic solvent which is at least water-soluble. Preferably, a mixed solvent of water and a water-soluble organic solvent is used as an aqueous medium for the water-based ink. In the present invention, the preferred proportion of the water-soluble organic solvent in the aqueous medium may be, for example, from 5 to 50 wt. %, with a range of from 10 to 40 wt. % being more preferred.

The water-soluble organic solvent is used in the water-base ink of the present invention to prevent solidification of the ink in nozzle portions due to its drying. Examples of such water-soluble organic solvents can include lower alcohols such as methyl alcohol, ethyl alcohol, n-propyl alcohol, isopropyl alcohol, n-butyl alcohol, sec-butyl alcohol and tertbutyl alcohol; diols such as ethylene glycol, diethyleneglycol, triethyleneglycol, tetraethyleneglycol, propylene glycol, butylene glycol, dipropylene glycol, tripropylene glycol, hexylene glycol, 1,2-butanediol, 1,3-butanediol, 1,4-butanediol, thiodiglycol and 1,4-cyclohexanediol; triols such as glycerin, 1,2,4-butanetriol, 1,2,6-hexanetriol and 1,2,5-pentanetriol; hindered alcohols such as trimethylolpropane, trimethylolethane, neopentylglycol and pentaerythritol; glycol ethers such as ethylene glycol monomethyl ether, ethylene glycol monoethyl ether, ethylene glycol monoisoproyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether and dipropylene glycol monomethyl ether; dimethylsulfoxide, glycerin monoallyl ether, polyethylene glycol, polypropylene glycol, N-methyl-2-pyrrolidone, 2-pyrrolidone, γ-butyrolactone, 1,3-dimethyl-2-imidazolidinone, sulfolane, β-dihydroxyethylurea, urea, acetonylacetone, dimethylformamide, dimethylacetamide, acetone, diacetone alcohol, tetrahydrofuran, and dioxane.

Particularly preferred, water-soluble organic solvents are glycerin and polyhydric alcohols other than glycerin, for example, diethylene glycol, ethylene glycol, polyethylene glycol, propylene glycol and the like. Two or more of such water-soluble organic solvents may be used in combination in the water-based ink.

In a preferred embodiment of the present invention, the ink contains water together with the water-soluble organic solvent. The preferred proportion of water in the aqueous medium may be, for example, 50 wt. % or more but less than 100 wt. %, with a range of 60 wt. % or more but less than 100 wt. % being more preferred. Preferably usable can be pure water, membrane filter-treated water, distilled and/or ion-change resin-treated water as water in the invention.

The preferred proportion of the colorant in the water-based ink according to the present invention may be, for example, from 0.1 to 20 wt. % based on the whole weight of the water-based ink, with a range of from 1 to 10 wt. % being more preferred. A colorant proportion smaller than 1 wt. % may have difficulty in providing printed images with sufficient image density in some instances, while a colorant proportion greater than 10 wt. % may lead to a reduction in ejection stability, for example, due to clogging at nozzles without bringing about any significant improvement in image density.

The preferred proportion of the resin in the water-based ink according to the present invention may be, for example, from 0.001 to 40 wt. % based on the whole weight of the water-based ink, with a range of from 0.01 to 20 wt. % being more preferred. A resin proportion smaller than 0.001 wt. % may result in images reduced in abrasion resistance, marker resistance and the like, while a resin proportion greater than 40 wt. % may result in a water-based ink of higher viscosity, possibly leading to a reduction in ejection stability, for example, due to clogging at nozzles.

To the water-based ink according to the present invention, various additives other than the above-described components may be added including, for example, surfactants, pH adjusters, antioxidants and antimolds. The preferred viscosity of the water-based ink according to the present invention may range from 1.0 mPa·s to 5.0 mPa·s at 25° C.

The inkjet recording process according to the present invention is characterized in that an image is formed by an inkjet recording system while using the water-based ink according to the present invention. Thermal energy or mechanical energy can be used as energy in inkjet recording, although use of thermal energy is preferred. No particular limitation is imposed on a recording material for use in the inkjet recording process of the present invention. Nonetheless, a recording material provided on at least one side thereof with an ink-receiving coating layer, which is commonly called "exclusive inkjet paper", can be used preferably. Desired is, for example, a recording material provided on at least one side thereof with an ink-receiving coating layer which contains at least a hydrophilic polymer and/or an inorganic porous material. The image formed by the inkjet recording process is excellent in ink fixing property and is good in abrasion resistance, waterproofness and marker resistance.

EXAMPLES

Based on Production Examples, Examples and Comparative Examples, the present invention will next be described more specifically. It is, however, to be noted that the present invention shall not be limited by the following Examples unless it departs from the gist thereof. In the following description, all designations of "part" or "parts" and "%" are on a weight basis unless otherwise specifically indicated. In each of the following Examples, the molecular weight and molecular weight distribution of the resin were measured using GPC (Gel Permeation Chromatograph) ("HLC-8220GPC", trade name; manufactured by TOSOH CORPORATION), identification of the resin was performed based on its measurement by an NMR spectrometer ("DPX400", trade name; manufactured by Bruker BioSpin Corp.), and each concentration of aluminum is a value measured by using an ICP optical emission spectrometer (inductively coupled plasma emission spectrometer) ("SPS 1700HV", trade name; manufactured by Seiko Instruments Inc.)

Production Example 1

[Synthesis of an A-B-C Triblock Copolymer (Resin A)]

A glass vessel fitted with a three-way cock was purged with nitrogen gas, and then, heated at 250° C. under a nitrogen gas atmosphere to remove any adsorbed water. After the system was allowed to cool down to room temperature, 1-isobutoxyethyl vinyl ether (10 mmol), ethyl acetate (16 mmol), 1-isobutoxyethyl acetate (0.1 mmol) and toluene (11 cm$^3$) were charged. When the internal temperature of the system had dropped to 0° C., ethyl aluminum sesquichloride (0.2 mmol) was added to initiate polymerization, and A segments of a triblock copolymer were synthesized.

Using the gel permeation column chromatograph (GPC), the molecular weight was monitored in a time division manner. Subsequent to the completion of the polymerization of the A segments, 2-methoxyethyl vinyl ether (12 mmol) was added to conduct synthesis of B segments. After completion of the polymerization of the B segments had been confirmed by monitoring the polymerization with GPC in a similar manner as described above, ethyl 4-(2-vinyloxyethoxy)benzoate (12 mmol) was added to conduct synthesis of C segments. Termination of the polymerization reaction was effected by adding into the system a 0.3% solution of ammonia in methanol.

Identification of the resultant triblock copolymer was conducted using NMR and GPC. It was possible to obtain satisfactory spectra in both of the analyses [number average molecular weight (estimated based on the standard polystyrene calibration) Mn=3.7×10$^4$, Mn/Mw=1.3 (Mw: weight average molecular weight (estimated based on the standard polystyrene calibration))].

To adjust the content of aluminum in the thus-obtained resin, samples of the resin were washed with a 0.6 N aqueous solution of hydrochloric acid to conduct purification of the resin such that the molar ratios of the resin to the aluminum in the individual samples reached the values described in Table 1 to obtain aluminum-containing resins having different aluminum contents. The molar numbers of aluminum are Values determined from the concentrations of aluminum in the individual resin samples. Ester portions in the C segments in the triblock copolymer were hydrolyzed in a mixed solvent of sodium hydroxide (5-fold equivalents) and methanol to convert the C segments into carboxylic acid polymers.

Examples 1–4 and Comparative Examples 1–4

The water-based inks of the Examples and the Comparative Examples were prepared by mixing the resin A, which had been purified as described above and contained aluminum at the corresponding content, with the corresponding colorant at the ratio shown in Table 1, adding diethylene glycol (20%) and "Acetylenol EH" (trade name for a surfactant produced by Kawaken Fine Chemicals Co., Ltd.; 0.15%), stirring the resultant mixture for 10 minutes, adding water in such an amount that the solid content of the colorant would finally reach 5% in the water-based ink, and then stirring the thus-obtained mixture. Further, each of the water-based inks so obtained was subjected to filtration under reduced pressure through a 0.2 μm membrane filter (product of Toyo Roshi Kaisha, Ltd.).

TABLE 1

| | Colorant | Colorant/resin (concentration in ink) | Resin/Al (molar ratio) |
|---|---|---|---|
| Example 1 | C.I. Solvent Yellow 1 | 5%/5% | 100/6 |
| Example 2 | C.I. Direct Black 17 | | |
| Example 3 | C.I. Solvent Yellow 1 | | 1,000/3 |
| Example 4 | C.I. Direct Black 17 | | |
| Comp. Ex. 1 | C.I. Solvent Yellow 1 | | 10,000/1 |
| Comp. Ex. 2 | C.I. Direct Black 17 | | |
| Comp. Ex. 3 | C.I. Solvent Yellow 1 | | 1/10 |
| Comp. Ex. 4 | C.I. Direct Black 17 | | |

Using the above-described inks of the Examples and Comparative Examples, recording was conducted on commercial copying paper (plain paper), "HK Genshi (Base Paper)" (product of Daishowa Paper Manufacturing Co., Ltd.), and glossy paper, "SP101" (product of Canon Inc.). Formation of an image (printing) was conducted using a water-based inkjet printer, "F660" (manufactured by Canon Inc.). Ranking of the prints was performed as will be described below. The ranking results are presented in Table 2. With the water-based inks of Examples 1–4, good results were obtained on both of the plain paper and the glossy paper as presented in Table 2.

(Abrasion Resistance)

After a printed paper had been left over for 12 hours or longer subsequent to its printing, "KIM WIPE" (trade name; product of CRECIA Corporation) was placed on the printed paper. Further, a weight of 500 g/12.56 cm² was placed on the "KIM WIPE". The weight was then caused to slide 5 strokes. With the naked eye, a blank area was observed for a smear, and a solid printed image and a character printed area were observed for rubbing. Ranking was performed in accordance with the following ranking standards. The ranking results are presented in Table 2.

A: A blank area is free of any smear, and a solid-printed image and a character-printed area are also free of rubbing.

B: A blank area has a slight smear, and a solid-printed image and a character-printed area contain traces of slight rubbing.

C: A blank area has a smear, and a solid-printed image and a character-printed area have been rubbed off at some parts thereof.

(Waterproofness)

After a printed paper had been left over for 12 hours or longer subsequent to its printing, the reflection density of the image was measured. Further, the printed paper was kept still for 5 minutes in tap water. After water was dried off, the reflection density of the image was measured to determine, as a scale of waterproofness, a percent remainder of the reflection density after a waterproofness test.

Ranking was performed in accordance with the following ranking standards. The ranking results are presented below in Table 2.

A: Percent remainder of image density ≧ 90%

B: 90% > Percent remainder of image density ≧ 80%

C: 80% > Percent remainder of image density ≧ 70%

(Marker Resistance)

After a printed paper had been left over for 12 hours or longer subsequent to printing characters thereon, the character-printed area was marked once under an ordinary writing pressure with a yellow marker pen manufactured by ZEBRA PEN CORPORATION. Its marker resistance was ranked in accordance with the following ranking standards. The ranking results are presented below in Table 2.

A: Neither bleeding at a printed area nor a smear at a blank area is observed, and a felt tip is not smeared either.

B: A blank area has a slight smear, while a printed area has slight bleeding.

C: A blank area has a smear, while a printed area has bleeding.

(Jettability)

The conditions of each printed image and the heater surface of an ink head after its printing were observed. Ranking was performed in accordance with the following ranking standards.

A: A solid-printed image area and a character-printed area are both successfully printed neat, and practically no deposit is observed on the heater surface.

B: A solid-printed image area and a character-printed area are both successfully printed neat, but a small deposit is observed on a heater surface.

C: A solid-printed image area and a character-printed area are both blurred, and a large deposit is observed on a heater surface.

TABLE 2

| | Abrasion resistance | | Water-proofness | | Marker resistance | | |
|---|---|---|---|---|---|---|---|
| | Plain paper | Glossy paper | Plain paper | Glossy paper | Plain paper | Glossy paper | Jettability |
| Ex. 1 | A | A | A | A | A | A | A |
| Ex. 2 | A | A | A | A | A | A | A |
| Ex. 3 | A | A | A | A | A | A | A |
| Ex. 4 | A | A | A | A | A | A | A |
| Comp. Ex. 1 | A | A | A | A | B | B | A |
| Comp. Ex. 2 | A | A | B | A | B | B | A |
| Comp. Ex. 3 | — | — | — | — | — | — | C* |
| Comp. Ex. 4 | — | — | — | — | — | — | C* |

*The inks of Comparative Examples 3 and 4 were so poor in jettability that the ranking of abrasion resistance, waterproofness and marker resistance was not feasible.

Production Example 2

[Synthesis of an A-B-C Triblock Copolymer (Resin B)]

A glass vessel fitted with a three-way cock was purged with nitrogen gas, and then, heated at 250° C. under a nitrogen gas atmosphere to remove any adsorbed water. After the system was allowed to cool down to room temperature, isobutoxyl vinyl ether (12 mmol) as a hydrophobic monomer, ethyl acetate (16 mmol) and toluene (11 mL) were charged. When the internal temperature of the system had dropped to 0° C., ethyl aluminum sesquichloride (0.2 mmol) was added to initiate polymerization, and A segments of a triblock copolymer were synthesized.

Using GPC, the molecular weight was monitored in a time division manner. Subsequent to the completion of the polymerization of the A segments, 2-methoxyethyl vinyl ether (12 mmol) was added as a hydrophilic monomer to conduct synthesis of B segments.

After completion of the polymerization of the B segments had been confirmed by monitoring the polymerization with GPC in a similar manner as described above, ethyl 4-(2-vinyloxyethoxy)benzoate (12 mmol), was added as a hydrophilic monomer to conduct synthesis of C segments. Termination of the polymerization reaction was effected by adding into the system a 0.3% solution of ammonia in methanol.

Identification of the resultant triblock copolymer was conducted using NMR and GPC. It was possible to obtain satisfactory spectra in both of the analyses [number average molecular weight (estimated based on the standard polystyrene calibration) Mn=3.7×10⁴, Mn/Mw=1.3 (Mw: weight average molecular weight (estimated based on the standard polystyrene calibration))].

To adjust the content of aluminum in the thus-obtained resin, samples of the resin were washed with a 0.6 N aqueous solution of hydrochloric acid to conduct purification of the resin such that the molar ratios of the resin to the aluminum in the individual samples reached the values described in Table 3 to obtain aluminum-containing resins having different aluminum contents. The molar numbers of aluminum are values determined from the concentrations of aluminum in the individual resin samples. Ester portions in the C segments in the triblock copolymer were hydrolyzed in a mixed solvent of sodium hydroxide (5-fold equivalents) and methanol, and the solvent was distilled off to obtain a carboxylic acid polymer.

Examples 5–8 and Comparative Examples 5–8

Water-based inks were prepared in a similar manner as in Examples 1–4 and Comparative Examples 1–4 except that the formulas in Table 3 were followed and the resin was changed from the resin A to the resin B. Printing and ranking of prints were also performed likewise. The ranking results are presented in Table 4.

TABLE 3

|  | Colorant | Colorant/resin (concentration in ink) | Resin/Al (molar ratio) |
| --- | --- | --- | --- |
| Example 5 | C.I. Solvent Yellow 1 | 5%/5% | 100/6 |
| Example 6 | C.I. Direct Black 17 | | |
| Example 7 | C.I. Solvent Yellow 1 | | 1,000/3 |
| Example 8 | C.I. Direct Black 17 | | |
| Comp. Ex. 5 | C.I. Solvent Yellow 1 | | 10,000/1 |
| Comp. Ex. 6 | C.I. Direct Black 17 | | |
| Comp. Ex. 7 | C.I. Solvent Yellow 1 | | 1/10 |
| Comp. Ex. 8 | C.I. Direct Black 17 | | |

TABLE 4

| | Abrasion resistance | | Water-proofness | | Marker resistance | | |
| --- | --- | --- | --- | --- | --- | --- | --- |
| | Plain paper | Glossy paper | Plain paper | Glossy paper | Plain paper | Glossy paper | Jettability |
| Ex. 5 | A | A | A | A | A | A | A |
| Ex. 6 | A | A | A | A | A | A | A |
| Ex. 7 | A | A | A | A | A | A | A |
| Ex. 8 | A | A | A | A | A | A | A |
| Comp. Ex. 5 | A | A | A | A | B | B | A |
| Comp. Ex. 6 | A | A | B | A | B | B | A |
| Comp. Ex. 7 | — | — | — | — | — | — | C* |
| Comp. Ex. 8 | — | — | — | — | — | — | C* |

*The inks of Comparative Examples 7 and 8 were so poor in jettability that the ranking of abrasion resistance, waterproofness and marker resistance was not feasible.

Production Example 3

[Synthesis of an A-B Diblock Copolymer (Resin C)]

A glass vessel fitted with a three-way cock was purged with nitrogen gas, and then, heated at 250° C. under a nitrogen gas atmosphere to remove any adsorbed water. After the system was allowed to cool down to room temperature, 2-decanoxyethyl vinyl ether (12 mmol), ethyl acetate (16 mmol), 1 isobutoxyethyl acetate (0.1 mmol) and toluene (11 cm³) were charged. When the internal temperature of the system had dropped to 0° C., ethyl aluminum sesquichloride (0.2 mmol) was added to initiate polymerization, and the A blocks of an A-B diblock copolymer were synthesized.

Using a gel permeation chromatography (GPC), the molecular weight was monitored in a time division manner. Subsequent to the completion of the polymerization of the A blocks, ethyl 4-(2-vinyloxyethoxy)benzoate (12 mmol) was added to conduct synthesis of B blocks. Termination of the polymerization reaction was effected by adding into the system a 0.3% solution of ammonia in methanol.

Identification of the resultant diblock copolymer was conducted using NMR and GPC. It was possible to obtain satisfactory spectra in both of the analyses [number average molecular weight (estimated based on the standard polystyrene calibration) Mn=$3.5\times10^4$, Mn/Mw=1.2 (Mw: weight average molecular weight (estimated based on the standard polystyrene calibration))].

To adjust the content of aluminum in the thus-obtained resin, samples of the resin were washed with a 0.6 N aqueous solution of hydrochloric acid to conduct purification of the resin such that the molar ratios of the resin to the aluminum in the individual samples reached the values described in Table 5 to obtain aluminum-containing resins having different aluminum contents. The molar numbers of aluminum are values determined from the concentrations of aluminum in the individual resin samples. Ester portions in B segments in the diblock copolymer were hydrolyzed in a mixed solvent of sodium hydroxide (5-fold equivalents) and methanol, and the solvent was distilled off to obtain a carboxylic acid polymer.

Examples 9–12 and Comparative Examples 9–12

Water-based inks were prepared in a similar manner as in Examples 1–4 and Comparative Examples 1–4 except that the formulas in Table 5 were followed and the resin was changed from the resin A to the resin C. Printing and ranking of prints were also performed likewise. The ranking results are presented in Table 6.

TABLE 5

|  | Colorant | Colorant/resin (concentration in ink) | Resin/Al (molar ratio) |
| --- | --- | --- | --- |
| Example 9 | C.I. Solvent Yellow 1 | 5%/5% | 100/6 |
| Example 10 | C.I. Direct Black 17 | | |
| Example 11 | C.I. Solvent Yellow 1 | | 1,000/3 |
| Example 12 | C.I. Direct Black 17 | | |
| Comp. Ex. 9 | C.I. Solvent Yellow 1 | | 10,000/1 |
| Comp. Ex. 10 | C.I. Direct Black 17 | | |
| Comp. Ex. 11 | C.I. Solvent Yellow 1 | | 1/10 |
| Comp. Ex. 12 | C.I. Direct Black 17 | | |

TABLE 6

|  | Abrasion resistance | | Water-proofness | | Marker resistance | | |
| --- | --- | --- | --- | --- | --- | --- | --- |
|  | Plain paper | Glossy paper | Plain paper | Glossy paper | Plain paper | Glossy paper | Jettability |
| Ex. 9 | A | A | A | A | A | A | A |
| Ex. 10 | A | A | A | A | A | A | A |
| Ex. 11 | A | A | A | A | A | A | A |
| Ex. 12 | A | A | A | A | A | A | A |
| Comp. Ex. 9 | A | A | A | A | B | B | A |
| Comp. Ex. 10 | A | A | B | A | B | B | A |
| Comp. Ex. 11 | — | — | — | — | — | — | C* |
| Comp. Ex. 12 | — | — | — | — | — | — | C* |

*The inks of Comparative Examples 11 and 12 were so poor in jettability that the ranking of abrasion resistance, waterproofness and marker resistance was not feasible.

Production Example 4

[Synthesis of an A-B Diblock Copolymer (Resin D)]

A glass vessel fitted with a three-way cock was purged with nitrogen gas, and then, heated at 250° C. under a nitrogen gas atmosphere to remove any adsorbed water. After the system was allowed to cool down to room temperature, isobutyl vinyl ether (12 mmol), ethyl acetate (16 mmol), 1 isobutoxyethyl acetate (0.1 mmol) and toluene (11 cm$^3$) were charged. When the internal temperature of the system had dropped to 0° C., ethyl aluminum sesquichloride ((0.2 mmol) was added to initiate polymerization, and the A blocks of an A-B diblock copolymer was synthesized.

Using a gel permeation column chromatography (GPC), the molecular weight was monitored in a time division manner. Subsequent to the completion of the polymerization of the A blocks, a vinyl monomer (12 mmol) which had been obtained by silylating the hydroxyl group of 2-hydroxyethyl vinyl ether with trimethylchlorosilane was added to conduct synthesis of B blocks. Termination of the polymerization reaction was effected by adding into the system a 0.3% solution of ammonia in methanol.

Identification of the resultant diblock copolymer was conducted using NMR and GPC. It was possible to obtain satisfactory spectra in both of the analyses [number average molecular weight (estimated based on the standard polystyrene calibration) Mn=3.7×10$^4$, Mn/Mw=1.3 (Mw: weight average molecular weight (estimated based on the standard polystyrene calibration))].

To adjust the content of aluminum in the thus-obtained resin, samples of the resin were washed with a 0.6 N aqueous solution of hydrochloric acid to conduct purification of the resin such that the molar ratios of the resin to the aluminum in the individual samples reached the values described in Table 7 to obtain aluminum-containing resins having different aluminum contents. The molar numbers of aluminum are values determined from the concentrations of aluminum in the individual resin samples. Hydrolysis of the hydroxyl group silylated with trimethylchlorosilane was conducted by adding water.

Examples 13–16 and Comparative Examples 13–16

Water-based inks were prepared in a similar manner as in Examples 1–4 and Comparative Examples 1–4 except that the formulas in Table 7 were followed and the resin was changed from the resin A to the resin D. Printing and ranking of prints were also performed likewise. The ranking results are presented in Table 8.

TABLE 7

|  | Colorant | Colorant/resin (concentration in ink) | Resin/Al (molar ratio) |
| --- | --- | --- | --- |
| Example 13 | C.I. Solvent Yellow 1 | 5%/5% | 100/6 |
| Example 14 | C.I. Direct Black 17 | | |
| Example 15 | C.I. Solvent Yellow 1 | | 1,000/3 |
| Example 16 | C.I. Direct Black 17 | | |
| Comp. Ex. 13 | C.I. Solvent Yellow 1 | | 10,000/1 |
| Comp. Ex. 14 | C.I. Direct Black 17 | | |
| Comp. Ex. 15 | C.I. Solvent Yellow 1 | | 1/10 |
| Comp. Ex. 16 | C.I. Direct Black 17 | | |

TABLE 8

|  | Abrasion resistance | | Water-proofness | | Marker resistance | | |
| --- | --- | --- | --- | --- | --- | --- | --- |
|  | Plain paper | Glossy paper | Plain paper | Glossy paper | Plain paper | Glossy paper | Jettability |
| Ex. 13 | A | A | A | A | A | A | A |
| Ex. 14 | A | A | A | A | A | A | A |
| Ex. 15 | A | A | A | A | A | A | A |
| Ex. 16 | A | A | A | A | A | A | A |
| Comp. Ex. 13 | A | A | A | A | B | B | A |
| Comp. Ex. 14 | A | A | B | A | B | B | A |
| Comp. Ex. 15 | — | — | — | — | — | — | C* |
| Comp. Ex. 16 | — | — | — | — | — | — | C* |

*The inks of Comparative Examples 15 and 16 were so poor in jettability that the ranking of abrasion resistance, waterproofness and marker resistance was not feasible.

INDUSTRIAL APPLICABILITY

As has been described in the above, the present invention can provide water-based inks excellent in abrasion resistance, waterproofness and marker resistance and also good in the stability of ejection at nozzles.

The invention claimed is:

1. A water-based inkjet printer ink comprising at least a colorant and a resin, wherein said resin is a block copolymer comprising at least one hydrophilic block and at least one hydrophobic block, each of said blocks is a vinyl ether polymer, wherein said block copolymer is obtained by polymerizing vinyl ethers as monomers by using at least one aluminum compound selected from the group consisting of tripropylaluminum, triisopropylaluminum, and aluminum compounds as Ziegler-Natta catalysts.

2. A water-based inkjet printer ink according to claim 1, wherein said aluminum compound contained in said block copolymer is adjusted such that a molar ratio of said block copolymer to said aluminum compound contained in said block copolymer is from 1:5 to 10,000:3.

3. A water-based inkjet printer ink according to claim 1, wherein said aluminum compound contained in said block copolymer is adjusted such that a molar ratio of said block polymer to said aluminum compound contained in said block polymer is from 100:6 to 1,000:3.

4. A water-based inkjet printer ink according to claim 1, wherein said block copolymer has a number average molecular weight of from 500 to 20,000,000.

5. A water-based inkjet printer ink according to claim 1, wherein said colorant is an oil-soluble dye.

6. An inkjet recording process wherein an image is formed by an inkjet recording system while using an a water-based inkjet printer ink according to claim 1.

* * * * *